US008723859B1

(12) United States Patent
Hirsch et al.

(10) Patent No.: US 8,723,859 B1
(45) Date of Patent: May 13, 2014

(54) LCD LARGE-SCALE DISPLAY

(76) Inventors: Eric D. Hirsch, Washington, DC (US); Joel Hirsch, Northridge, CA (US); Francis J McNeal, Simi Valley, CA (US); Michael J. Hirsch, Washington, DC (US)

( * ) Notice: Subject to any disclaimer, the term of this patent is extended or adjusted under 35 U.S.C. 154(b) by 237 days.

(21) Appl. No.: 13/085,309

(22) Filed: Apr. 12, 2011

Related U.S. Application Data

(63) Continuation-in-part of application No. 12/978,339, filed on Dec. 23, 2010, now abandoned.

(60) Provisional application No. 61/289,889, filed on Dec. 23, 2009.

(51) Int. Cl.
*G06F 17/00* (2006.01)
*G06T 1/00* (2006.01)
*G09G 5/00* (2006.01)

(52) U.S. Cl.
USPC .......... 345/418; 345/1.3

(58) Field of Classification Search
USPC .......... 345/418
See application file for complete search history.

(56) References Cited

U.S. PATENT DOCUMENTS 5,191,748 A * 3/1993 Baughman .......... 52/28
2006/0248758 A1* 11/2006 Nolte .......... 40/446
2010/0121693 A1* 5/2010 Pacana .......... 705/14.4
2011/0035776 A1* 2/2011 Nagai .......... 725/75

* cited by examiner

*Primary Examiner* — Jacinta M Crawford
*Assistant Examiner* — Sohum Kaji

(57) ABSTRACT

A Large Scale LCD Display System comprising a plurality of individual image substrates in communication with a micro-processor which communicates a portion of a large overall image to be depicted by each constituent substrate such that the end result is a complete depiction of the large overall image.

2 Claims, 10 Drawing Sheets
(2 of 10 Drawing Sheet(s) Filed in Color)

Display Field where $\mathbf{n} = \mathbf{m} = 3$, $n = m = 2$, $C_0 = C_1 = C_2 = 20$ and $R_0 = R_1 = R_2 = 30$

LCD LARGE-SCALE DISPLAY

I. CROSS-REFERENCE TO RELATED APPLICATIONS

This application is a continuation in part of U.S. Ser. No. 12/978,339, filed Dec. 23, 2010, now abandoned which in turn is a non-provisional application which claims the benefit under 35 U.S.C. §119(e) to U.S. Provisional Application 61/289,889, filed Dec. 23, 2009, the entire contents of all of which are hereby incorporated by reference.

II. FIELD OF THE INVENTION

The present invention relates to large scale electronic displays. More particularly, the present invention relates to a system for generating LCD large scale window displays and methods of using the same.

III. BACKGROUND OF THE INVENTION

A. Large Scale Electronic Displays

The use of electronics to display information and images in well known in the art. Typically, electronic displays comprise either the use of an image generating screen or an image reflecting screen. Image generating screens typically comprise a clear glass or translucent screen with pixels for forming an image imbedded in the screen. Examples of image generating screen include computer monitors, LCD televisions, or the like. Image reflecting screens typically comprise a flat light-reflective surface for reflecting an image cast from a light source in a manner visible to an intended audience. Examples of image reflecting screens include movie theaters, projection TV, overhead projectors and the like.

When it comes to generating large scale displays and images, prior artisans typically chose the use of image reflecting technology when practicable. The reason is two-fold. The enormous weight and cost of assembling, supporting and powering a large scale image generating screen is often too burdensome and cost prohibitive for most projects. The deployment of giant LCD screens and the like are common in professional sports complexes which require the ability to generate images in a manner consistent with existing high definition television technology and while also having the capital to fund such large LCD screen undertakings. Outside of such specialized uses, when it comes to generating large visual images, the art favors projection/reflection technology. In sum, those of ordinary skill in the art simply find it too expensive and cumbersome to attempt to use large scale LCD imaging technology outside of these expensive, fixed facilities. It is simply cheaper to transport, find or use an existing flat surface such as a wall for a reflective screen when it comes to large scale visual displays.

Large scale visual projection/reflection methods are known in the art and found in many practical applications, particularly indoors where darkness is controllable, such as with movie theaters and projection TVs. Another use becoming more popular is the use of strong outdoor light sources to depict an image on the side of a building after the sun sets. During the winter holiday season, it is not uncommon to see the side of buildings in urban areas lit with decorative, festive holiday patterns. However, this technology has several drawbacks. For example, during daylight hours, the light sources are simply too weak to overpower the sun and allow the image to be discerned on the side of buildings. Additionally, the strong light sources necessary to project the images on the sides of buildings can be distracting and blinding to occupants of the building when the display is lit.

Additional drawbacks less readily appreciated include the difficulty it can be in setting or changing the light sources when a change to the image is wanted. For example, if one wanted to add or edit text to the image on the side of the building, a new template for the lights would need to be created as well as a potential need to reposition the lights. In other words, unlike LCD imaging technology, this outdoor reflective technology is almost trial and error, and very slow at that. These drawbacks and others, coupled with the cost of high power lights, light bulbs, and maintenance dissuade the thought of using visual displays on the outside of buildings in most instances. Likewise, the cost of LCD image technology renders it impractical for all but the most expensive applications such as sports arenas, Times Square, etc.

The foregoing underscores some of the problems associated with prior art large scale electronic visual displays. Furthermore, the foregoing underscores the long-felt, yet unresolved need in the art for cost effective visual displays that can make use of LCD electronic imaging technology on a large scale.

B. LCD Technology

LCD imaging technology is well known in the art. Rather than provide a detailed dissertation or explication of LCD technology, suffice it for present purposes to note that those of ordinary skill in the art are presumed to be knowledgeable of the state of the art of LCD imaging and the rudimentary details of such will not be recited herein.

For background it is noted that displaying images through the use of Liquid Crystal Display (LCD) and related technology is well known in the art. For example, prior artisans disclose various LCD and related technology in the following patents and applications, which are hereby incorporated by reference in their entirety:

| Patent (Or Application) | Description |
|---|---|
| US 2009/0262100 A1 | Liquid Crystal Display and a Driving Method Thereof |
| PCT/FR2005/002064 | Liquid Crystal Display Comprising Improved Switching |

Means at the Display Periphery

| | |
|---|---|
| US 7,233,375 | Liquid Crystal Display |
| US 7,180,561 B2 | Liquid Crystal Display Device |
| US 5,529,818 | Liquid Crystal Display Device |
| US 7,049,689 | Chip On Glass Package |
| US 7,102,611 | Chip-On-Glass Type Liquid Crystal Display |
| US 6,624,868 | Chip-On-Glass (COG) Structure Liquid Crystal Display (LCD) |
| US 4,190,855 | Installation of A Semiconductor Chip On A Glass Substrate |
| US 2009/0147030 | LCD Driver IC and Method for Operating the Same |
| PCT/US1997/016320 | LCD Driver IC with Pixel Inversion Operation |
| US 2009/0291539 | Method for Manufacturing an LCD Driver IC |
| US 6,727,879 | LCD Driver in Multi-Line Selection Driving Method |
| EP 1,538,596 | LCD Driver with Adjustable Contrast |
| US 7,564,786 | Multicast Method in ZigBee Network |

General Technologies:
ZigBee
IEEE 802.15.4
IEEE 802.15.4a

However, as will be appreciated by one of ordinary skill in the art, neither these prior artisans, nor any other artisans of which the present inventors are aware, teach or suggest a system and method for displaying images on large-scale windows and the like using LCD imaging technology. Thus, there remains a long-felt, yet unresolved need in the art for a system and method of using LCD technology for large-scale visual displays.

IV. SUMMARY OF THE INVENTION

The foregoing highlights various drawbacks in the art when it comes to attempting large-scale visual displays. These and other drawbacks in the art may be satisfied by the present invention. In accordance with one object of the present invention there is provided a method of using a plurality of separate component panels in communication with a processor for displaying a component portion of an overall image on a given component panel, thereby having the overall aggregate image displayed when the separate component panels are activated in concert.

In accordance with another object of the present invention there is provided another method of using what the inventors herein call "LCD Large Scale Displays" for displaying an image, hue, or color in an area typically occupied by regular glass, such as a building, home or car window, to provide privacy for the occupants, present information or advertisements to those outside, or otherwise simply present any other informative, decorative, or aesthetically pleasing images.

While the present invention will be defined in connection with displaying images using the windows of tall buildings, one of ordinary skill in the art armed with the present specification will readily appreciate that the present invention may be used in conjunction with a multitude of applications for a multitude of uses. For example, the novel Large Scale LCD Display of the present invention may be used to provide advertising messages on the side of buildings, static and/or dynamic, moving images on the side of buildings, configured to display a series of letters or numbers on the side of buildings or house to spell out or indicate an emergency situation or the like, provide privacy by making windows opaque to viewers when desired, or otherwise providing a mosaic of individual images into an overall desired end product. Accordingly, the present invention should not be viewed as limited to applicability solely in areas of existing glass, but rather understood to be applicable to any suitable situation or medium where the present invention may be used or desired to present a Large Scale LCD Display in one or a multitude of constituent parts.

In accordance with a presently preferred embodiment of the invention, there is provided a method of fusing various imaging arts and techniques together in a manner to produce a novel approach of creating what the inventors describe as a "Large Scale Glass Panel Image Substrate" capable of creating standalone graphic displays on a large scale basis for the purpose of visual imaging such as the provision of decorative art and/or privacy. For the purpose of the following enabling description, "Large Scale" is defined as any application requiring substrate coverage in excess of 100 inches square; however, the invention should not be deemed limited to such dimension or those of its magnitude; rather the invention should be understood to provide a system and method of displaying visual images that can be scaled infinitely in size (within the confines of available processing power and memory)

These and other objects and advantages of the present invention may be realized and more readily understood by one of ordinary skill in the art by reference to the practical embodiments described herein. Given the following enabling description of the drawings, the novel LCD Large Scale Displays of the present invention and their various respective advantageous features should become evident to a person of ordinary skill in the art.

V. BRIEF DESCRIPTION OF THE DRAWINGS

The patent or application file contains at least one drawing executed in color. Copies of this patent or patent application publication with color drawings(s) will be provided by the Office upon request and payment of the necessary fee.

The present invention is described with reference to the accompanying drawings. In the drawings, like reference numbers indicate identical or functionally similar elements.

VI. DETAILED DESCRIPTION OF THE DRAWINGS

Figure 1:
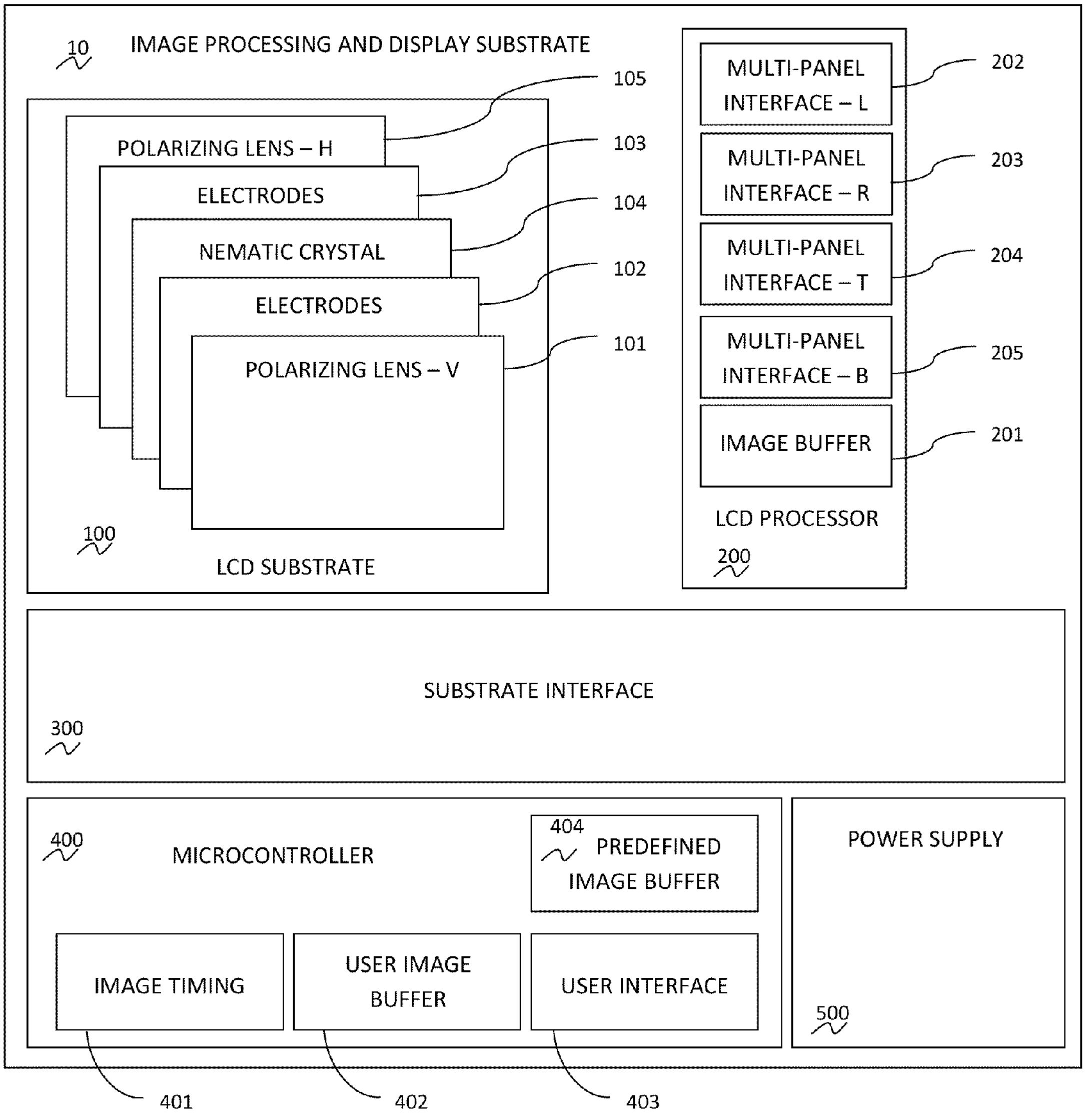
FIG. 1 depicts a block diagram of the architecture of an LCD Large Scale Display system according to one embodiment of the invention.
Figure 2:
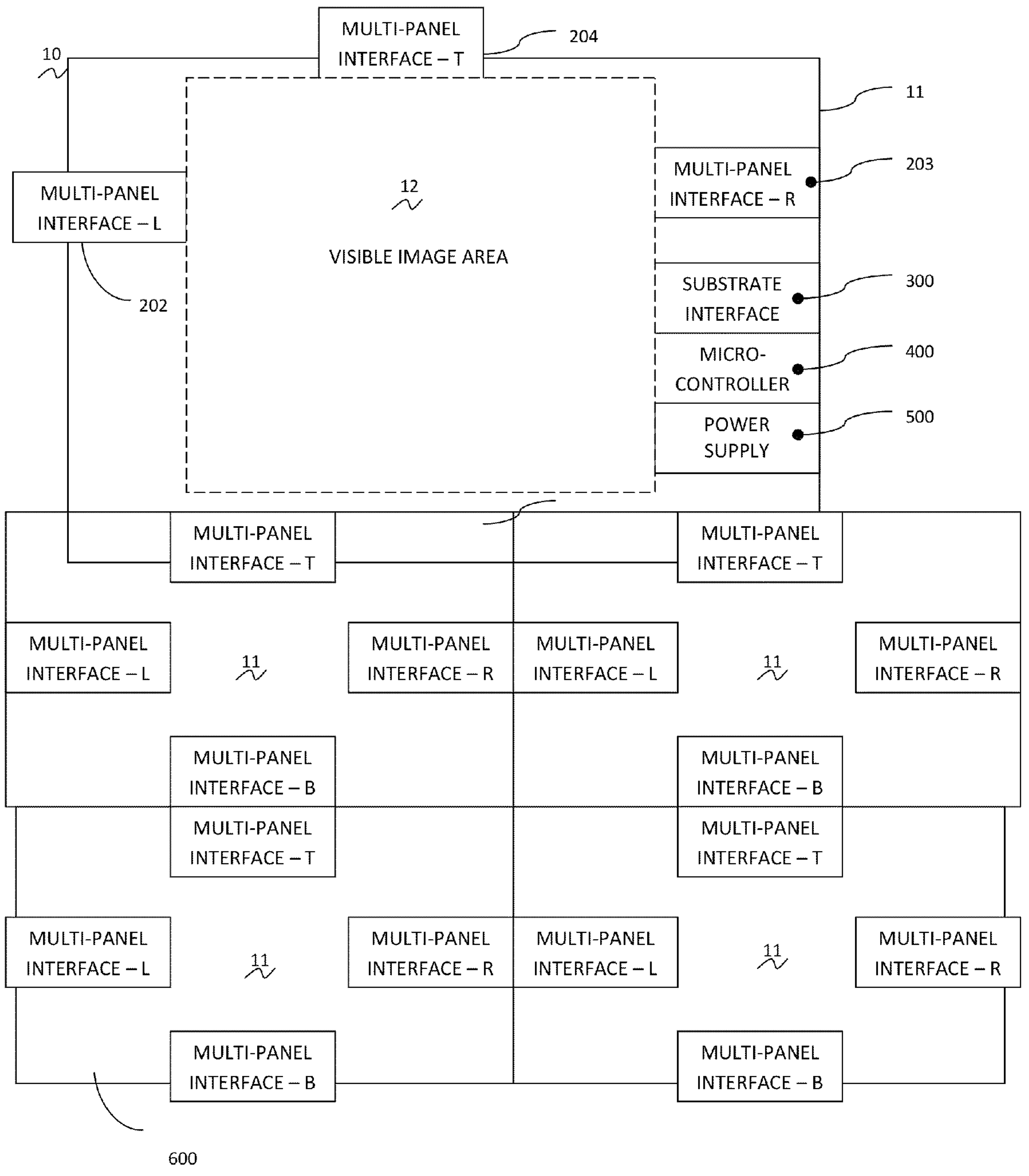
FIG. 2 depicts a block diagram of various features of an LCD Large Scale Display system according to one embodiment of the invention.
Figure 3:
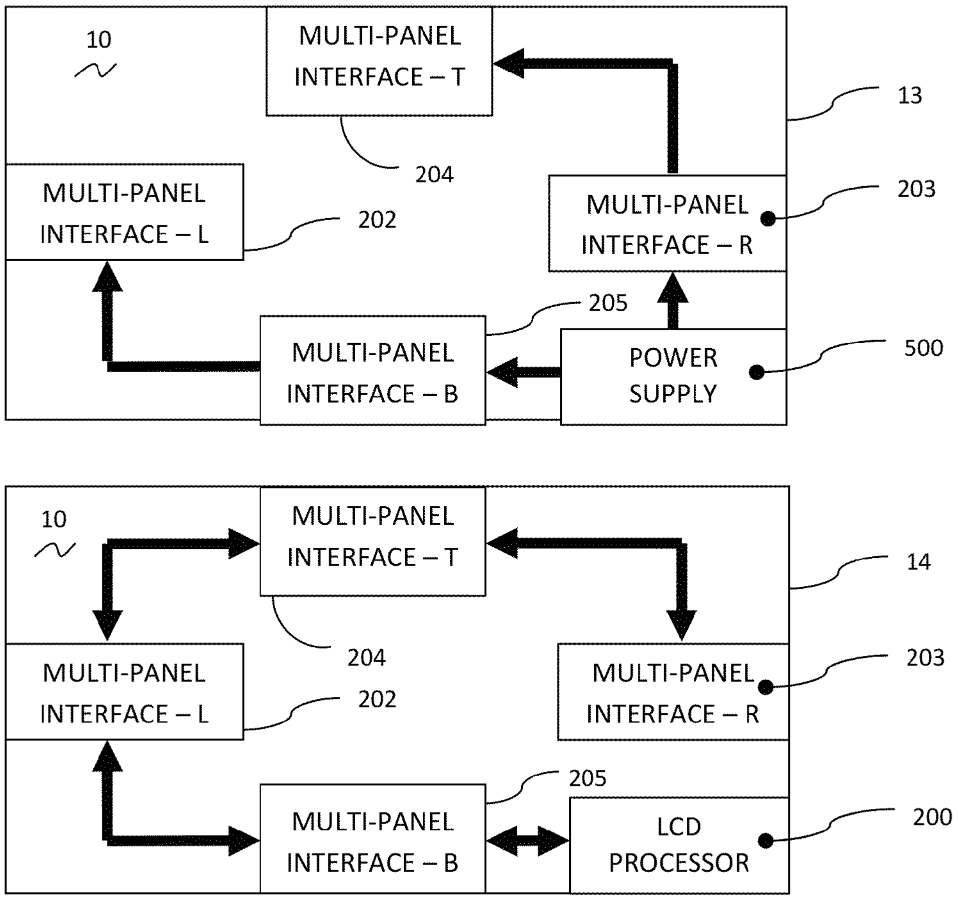
FIG. 3 depicts a block diagram of various features of the power and data distribution features of an LCD Large Scale Display System according to one embodiment of the invention.

FIGS. 1-11 show various components and views of presently preferred embodiments of the invention. FIGS. 1-3 depict a presently preferred architecture and hardware for the depicted embodiment. As shown, the LCD Large Scale Display System comprises an Image Processing and Display Substrate (10) as the basic building block or mechanism in the System to scale multiple panels, windows, or other image display areas to increase to an overall area of coverage as well as a mechanism for the user to upload personal images or, alternatively, utilize predefined images in the overall display. In the depicted embodiment, the Large Scale Glass Panel Substrate (10) comprises an LCD substrate (100) on an LCD glass panel (11) driven by a commercially available LCD Display Processor (200).

As will be appreciated by one of ordinary skill in the art armed with the present specification, any suitable substrate or panel may be used in connection with present invention. While the presently preferred embodiment contemplates the use of LCD panels disposed on existing windows in a manner akin to storm windows, alternate embodiments contemplate LCD panels disposed in place of existing windows, or alternatively, building windows manufactured to include image generating pixels embedded therein to accomplish the imaging features of the present invention.

Turing back to the Figures, the Display Processor (200) receives information from a Microcontroller (400), preferably an onboard microcontroller of the like known in the art, for managing a Display Processor (200) as well as providing an interface point to a User (403). The bridge between the Display Processor (200) and the Microcontroller (400) is further defined and depicted in the Figures with the Substrate Interface (300) abstracting the display components from the Microcontroller subsystem.

In accordance with the depicted embodiments, an objective of the LCD Large Scale Display System is to provide a means for displaying large-scale images over one-to-many windows or LCD glass panels. This System can be abstracted on an infinite scale providing the ability for a user to display images across the front of a dwelling or preferably, the exterior surface of a multi-story business building having a glass windowed front. In operation, this accomplished by incorporating two-or-more Image Processing and Display Substrates (10) as constituent components, or building blocks, in a single image generating application. In the configuration depicted in Figures, Image Processing and Display Substrate (10) communicates via a plurality of Multi Panel Interfaces (202, 203, 204, 205) located on each individual constituent panels. These interfaces ensure a coordinated action of display for the overall image that is to be spread across two or more Image Processing and Display Substrates (10).

As shown in the Figures, the System comprises the Image Processing and Display Substrates (10), corresponding Substrate Interface (300), Microcontroller subsystem (400) used to mange a specific Image Panel, and a local Power Supply (500). In operation, this architecture allows numerous Image Processing and Display Substrates (10) to be interfaced into an overall single Display Field (600).

Turning back to the Microcontroller (400). In a presently preferred embodiment, the Microcontroller's subsystem consists of a die-on-glass integrated circuit providing Image Timing (401), User Image Buffering (402), a User Interface (403), a pre-define Image Buffer (404), and a localized Power Supply (500).

In accordance with a presently preferred embodiment, the Timing circuitry (401) is preferably provided by commercially available LCD processing technology as is the Microcontroller (400), Power Supply (500), and Flash Memory (402, 404). The User Interface (403) can be either hard-wired (USB) or Wireless (ZigBee). This User Interface flexibility provides the necessary flexibility and security.

In applications where more than one Image Processing and Display Substrate (10) is used, a single User Interface Point (403) can be used to transfer information to several Image Processing and Display Substrates (10) via the Image Processing and Display Substrate's (10) cooperative Multi-Channel Interface's (202, 203, 204, and 205).

Additionally, as will be appreciated by one of ordinary skill in the art, because LCD power requirements are so low, power, too, can be shared across numerous Image Processing and Display Substrates (10). In accordance with this aspect of the present invention, FIG. 3 depicts alternate power and data distribution possibilities wherein in one embodiment an embodiment of an Image Processing and Display Substrate (13) uses a local Power Supply (500) while in an alternate embodiment of an Image Processing and Display Substrate (14) it harnesses the power of the LCD processor (200).

Figure 4:
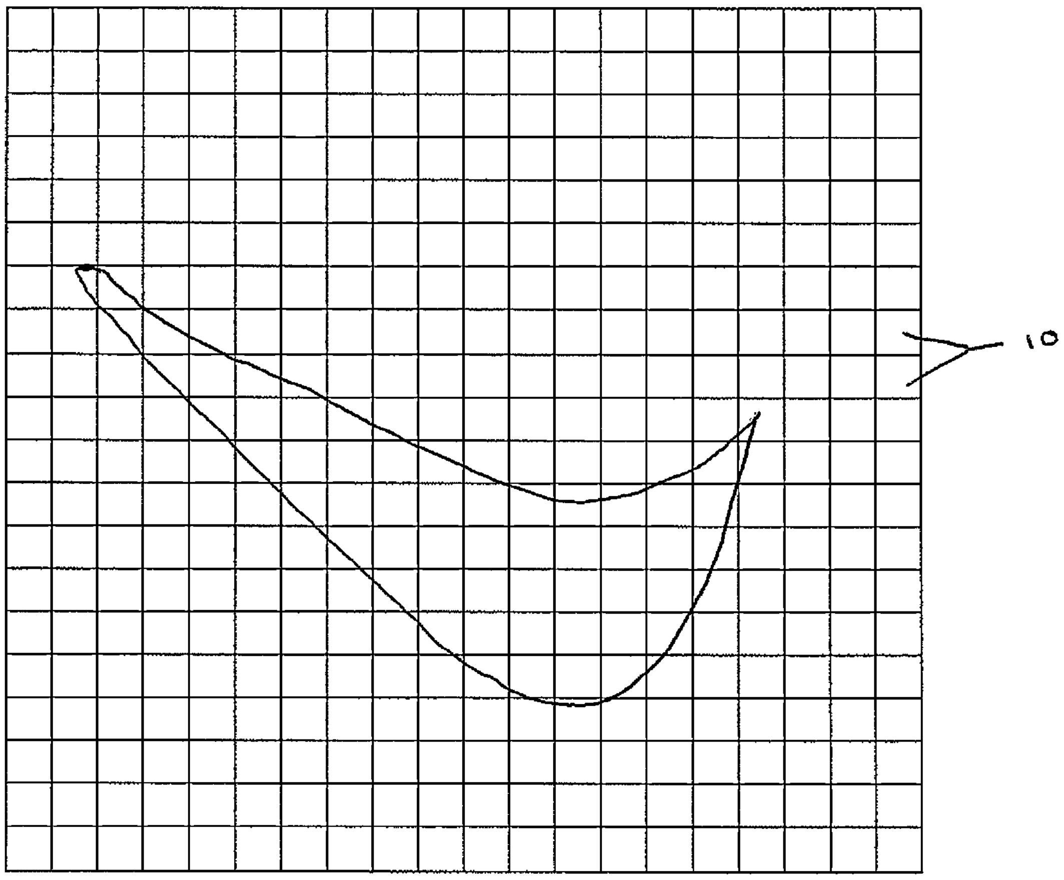
FIG. 4 depicts an embodiment of an image generated on the side of a building using the LCD Large Scale Display System of the present invention.

According to the present invention, in the various depicted embodiments, the Substrate Interfaces (202, 203, 204, and 203) may be wired or wireless. In a wired configuration, a physical connection is required between Image Processing and Display Substrates (10). This physical connection may require Image Processing and Display Substrates (10) to be located in a side-by-side or top-to-bottom configuration for ease of construction and is a presently preferred approach for suitable applications. FIG. 4 depicts a glass façade building wherein the glass is in fact a plurality of connected Substrates (10). The construction of the building having a continuous glass façade lends itself to using a side-by-side and/or top-to-bottom physical connection configuration to lead to the ultimate image generation of the System, which as depicted is the presentation of a Nike "swoosh" image on the building.

In applications where a wired application is not practical, a wireless interface can be established between Image Processing and Display Substrates (10). If this approach is adopted, then the Multi-Panel Interfaces (202, 203, 204 and, 205) can be virtual as opposed to physical and the data can be managed by the Microcontroller (400) subsystem. Configuring a suitable system for carrying out the object of the invention is well within the ability of one of ordinary skill in the art armed with the present specification. In operation, in applications such as that of FIG. 5, wherein the windows of a building are separated by brick and mortar, replacing the windows or adorning them with Substrates (10) makes deployment of physical connections more challenging, thereby lending this application to a wireless interface for communication amongst the System and each individual window/Substrate (10). The ultimate image is the display of a "Merry X-Mas" message but any suitable text, image, or message may be composed.

In operation, the presently preferred embodiments of the basic system of the present invention are based upon LCD technology, which allows for windows to remain relatively transparent when not in use. While in use, light necessary for the LCD (backlighting) is provided by the confines which the Image Processing and Display Substrates (10) enclose.

Figure 5:
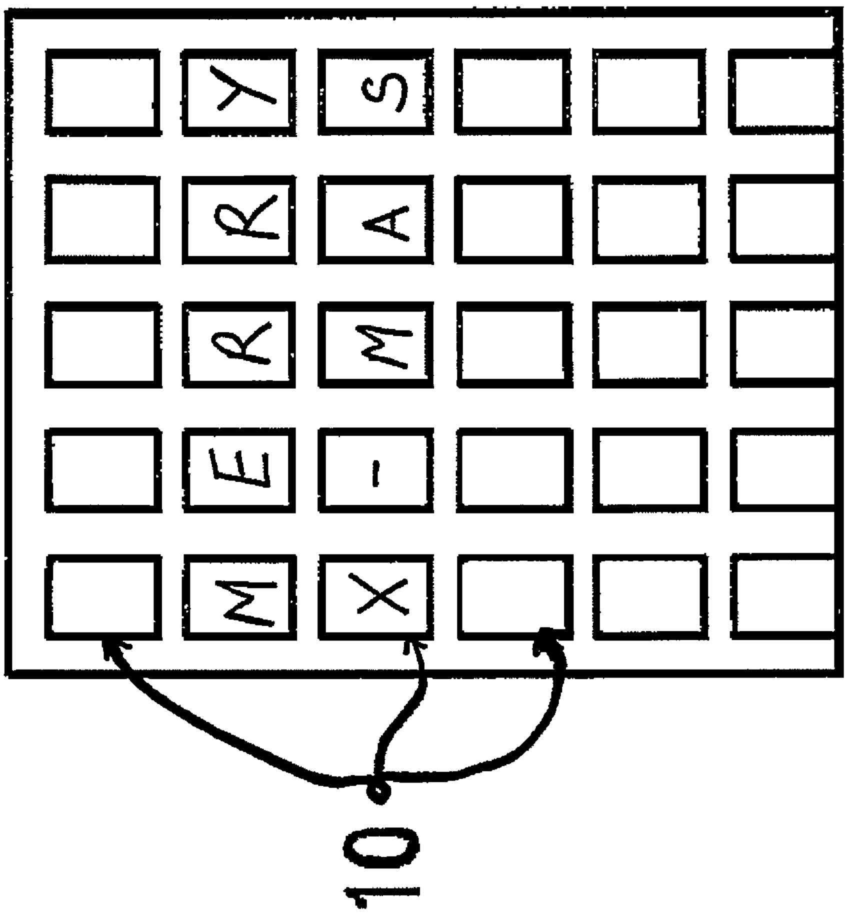
FIG. 5 depicts an alternate embodiment of an image generated on the side of another building using the LDC Large Scale Display System of the present invention.

A primary application of the present inventors contemplated by the present inventions is to allow the System to be used to display large scale images on a glass building front for the purpose of advertising and generating subsequent advertising revenue. The system would allow for periodic updating or changing of the advertising content by uploading new and/or different images to the systems with extreme ease and no real expense, unlike other forms of external building advertisements. In accordance with this presently preferred use of the depicted embodiments of the invention, an entire building or portion thereof could be used to promote a specific product as is generally shown in FIGS. 4 and 5.

FIGS. 6-11 depict an exemplary embodiment to show the steps of from the taking a desired image and processing it in the system to its ultimate display on the LCD Large Scale Display. In this embodiment, the basic system consists of two major components: A series of one or more Large Scale Glass Substrates (10) and a standard desk or lap-top computer system (Computer/Processor 1000) for image management. The Computer 1000 and associated software exists in the art and one of ordinary skill armed with the present specification will readily appreciate that the system can be managed from numerous simple methods; however, for exemplary purpose a presently preferred method is discussed herein for clarity of operation of the overall Display Field (600).

For starters, the System comprises a Computer to drive the graphics and a pre-defined Display Field (600). From known techniques in the art, the Computer is aware of the Display Field configuration including the partitioning of the individual glass panels (10), their orientation, and the pixel configuration of each of the individual panels. It should be noted that each panel (10) can have a unique pixel configuration defined as rows and columns, as long as the configurations are known by the Computer. In order to utilize the System, the User first creates a graphic image using any available graphics program. Although the Display System can be extended to a color system, for the purpose of this enabling discussion, the presently preferred monochrome application is discussed.

Figure 6:
FIG. 6 depicts a color image to be converted for monochrome presentation according to one embodiment of the invention.
Figure 7:
FIG. 7 depicts the color space transformed image of FIG. 6.

Turning to FIG. 6, as in this exemplary monochrome embodiment, if a color image is selected by the User, prior to managing the information typical color-space transform will be incorporated to convert the color image to monochrome. These typical transform operations are well-defined and well within the ability of one of ordinary skill in the art. As shown in FIGS. 6 and 7, in this specific monochrome application, it is necessary that a monochrome image eventually be created that will represent the final image to be displayed by the Display Field. Specifically as shown, FIG. 6 represents a potential image to be displayed by the System, whereas FIG. 7 represents the color space transform of that image (the monochrome representation).

Once the transform is affected, the next step is pixelization of the image. This is accomplished by first determining the absolute number of pixels in the overall System that are available for display. To determine the number of pixels, these abstract formulas are presented herein:

$$C_t = \sum_{p=0}^{n} PC_n$$

$$R_t = \sum_{p=0}^{m} PR_m$$

Where:

P represents any given substrate (also defined as a Panel)

$P_{n,m}$ represents an index to a specific panel, where n is the X-Direction (left-to-right) index and m is the Y-Direction (top-to-bottom) index n represents the number of substrates available in the X-direction (left-to-right)

$PC_n$ represents the number of pixels in the column of Image Processing and Display Substrate n $C_t$ represents the total number of pixels in the X-direction (left-to-right) available for the image m represents the number of substrates available in the Y-direction (top-to-bottom)

$PR_m$ represents the number of pixels in the row of Image Processing and Display Substrate m $R_t$ represents the total number of pixels in the Y-direction (top-to-bottom) available for the image Using these formulas, the monochrome image can now be pixilated. For this example, n=2, m=2, $PC_0=PC_1=PC_2=20$, and $PR_0=PR_1=PR_2=30$. It must be noted that $C_x$ and $R_x$ can be any value representing any size of display, and the values represented herein are for discussion only. For illustrative purposes, FIG. 8 provides a graphic demonstration of this process.

Figure 8:
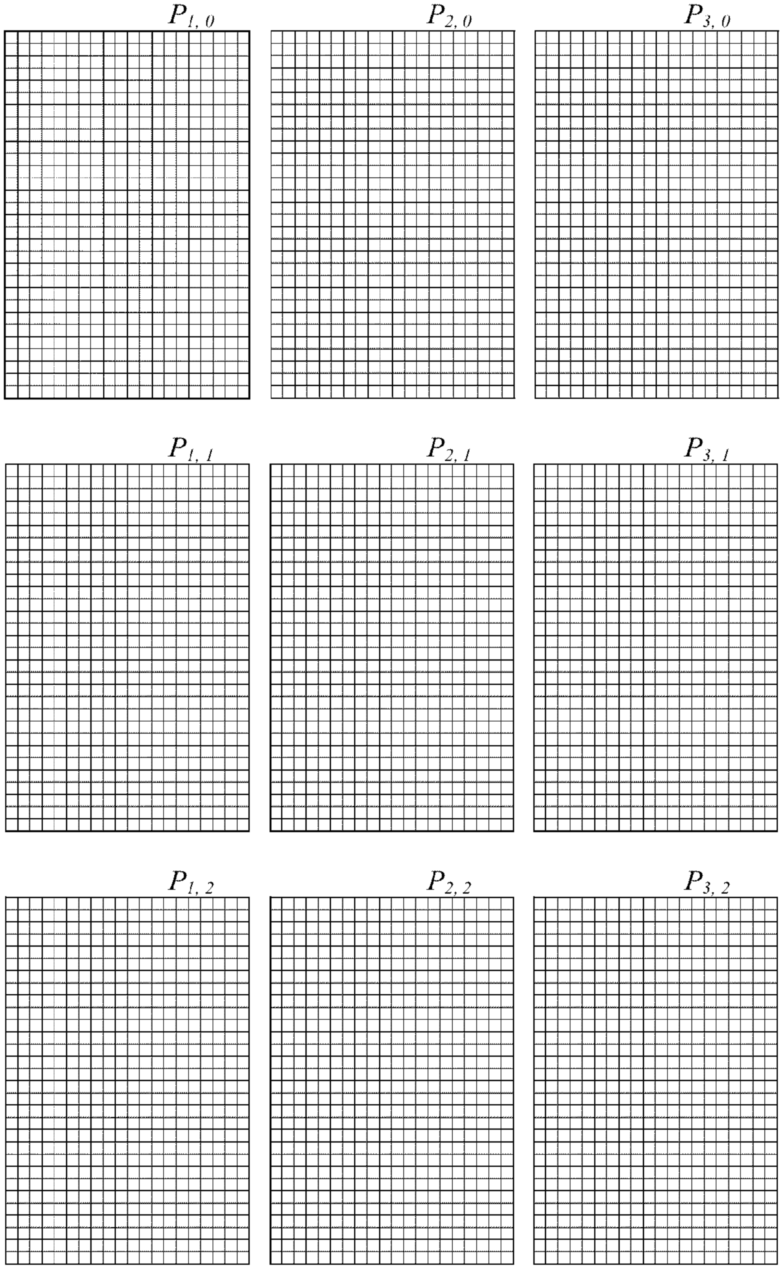
FIG. 8 depicts an LCD Display Field according to on embodiment of the invention wherein n=m=3, n=m=2, Co=c1=c2=20 and R0=R1=R2=30.
Figure 9:
FIG. 9 depicts the pixilated image of FIG. 7 for use in accordance with an embodiment of the invention.
Figure 10:
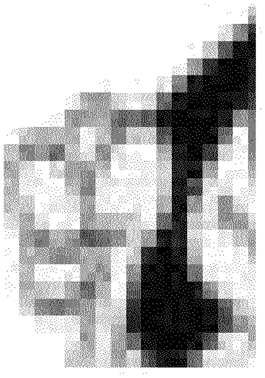
FIG. 10 depicts the image of FIG. 9 pixilated to fit the substrate matrix in accordance with an embodiment of the invention.
Figure 11:
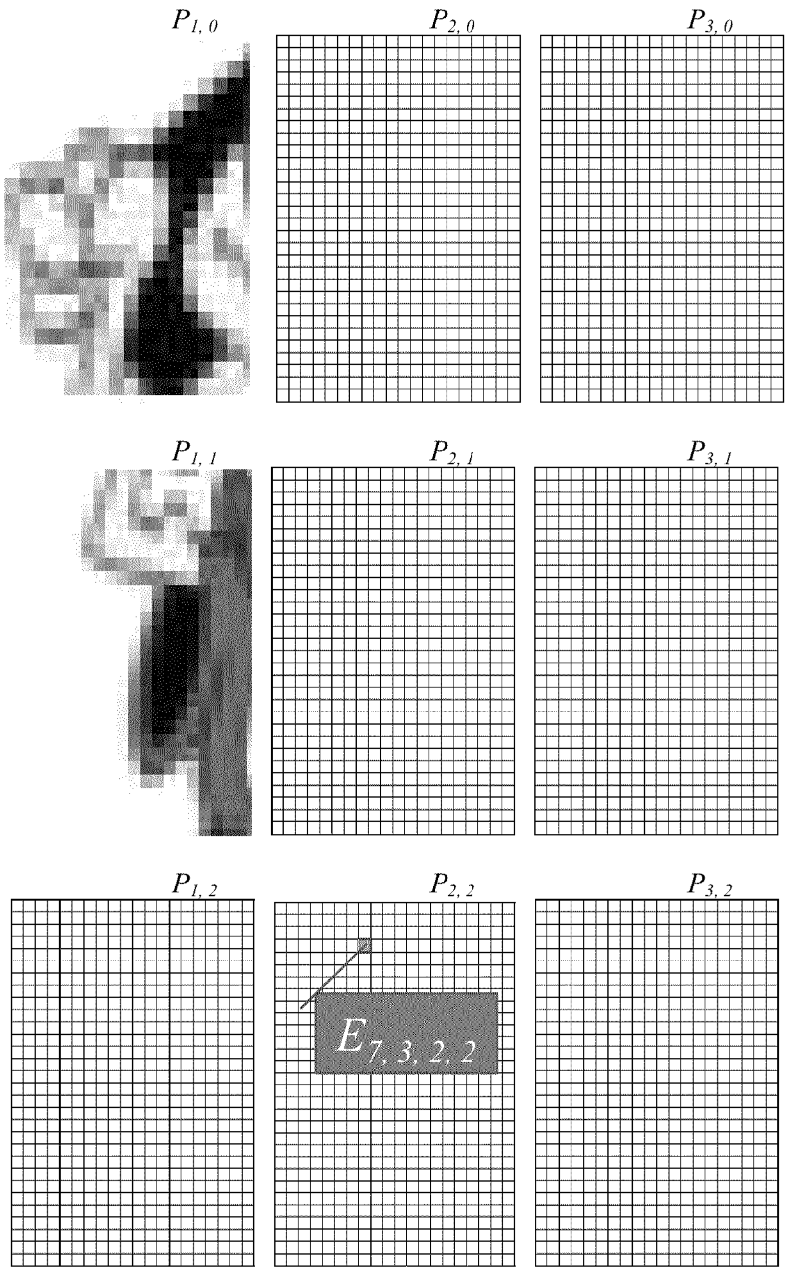
FIG. 11 depicts a graphical representation of the fitting of the pixilated image to fit the individual substrates of the overall display area.

With specific reference to FIG. 8, it can be discerned that once given the total number of pixels available, the image can be pixilated to fit the viewing area. FIG. 9 represents an example of a pixilated image for display. The overall image will now be partitioned to fit the substrate matrix as defined by FIG. 10. Finally, FIG. 11 shows a partial fitting (upper-right-hand-corner) of the pixilated image to the overall image system. For brevity, only two panels are shown. However, the concept can easily be extrapolated over the entire image over the entire panel system by one of ordinary skill in the art armed with the present specification.

The final step is to create a numeric value that represents each pixel in each panel and encapsulating that value into a multidimensional array to be transmitted from the Computer System to the Display System.

Each of the individual panels in this example consist of 600 pixels elements designated $E_{v,w}$, where v is the element in the X-Direction and w is the element in the Y-Direction. From this it can be stated the $E_{v,w,x,y}$ represents a specific element on a specific panel. For example, $E_{7,3,2,1}$ ultimately represents the eighth element from the left, four elements from the top (assuming zero-indexing), of the bottom-center panel in FIG. 11.

The embodiment discussed above represents the basic mechanism of generating the array of pixilated values generated by the computer that will be transmitted to the Display System. As will be appreciated by one of ordinary skill in the art, the embodiment is understood in the context of the state of the art wherein: 1) The Computer System is aware of the orientation of the individual panels (10) in the overall Display System. Typically, this is established during installation and setup of the initial System; and 2) The Computer System is aware of the individual pixels available in each of the Substrate Panels (10). This, too, is typically established during installation and setup of the initial System.

For example, each Image Processing and Display Substrate (10) is defined a unique identification number during production. That number is also known by the Computer System. Additionally, during manufacture, the panel pixel orientation (number of pixels in the x-y orientation) of each panel is also known by the Computer System. Finally, the placement of each panel (10) is also known by the Computer System. As will be appreciated, all of these aspects are preferably established during the installation of the overall Display System (600) and the computer system is made aware of these parameters during initial installation and setup. This is the basic mechanism by which the image is pixilated and the image array is created according to this embodiment of the invention. Moreover, during actual operation, the final element of image display is to assign a numeric value to each individual pixel representing the darkness of each pixel, and encapsulating each value into the array. For reference, the example Display System (600) described herein contains a total of 60 pixel elements in the X-direction and 90 pixel elements in the Y-Direction (20 pixels*3 panels for X, and 30 pixels*3 panels for Y).

In this embodiment, the final pixel array to be transmitted to the Display System (600) is a four-dimensional array of values representing the darkness (or lightness) of each individual pixel as defined above. The depth of the levels of gray is independent of the invention, but should be represented as the smallest possible value necessary to present a suitable image. For example, in a given application, two bits of depth may be adequate. However, for a higher-quality image, four bits of color depth may be desired or even possible eight bits for extreme quality. The only requirement is that the overall System is aware of the bit depth so that the Computer System can correctly package the array so that it is understood by the Display System (600) and ultimately by the individual Image Processing and Display Substrates (10).

For the presently preferred embodiment, in operation, upon initialization, the image stored in the Predefined Image Buffer (404) is transferred into the User Image Buffer (402). The image that has been transferred from the Predefined Image Buffer (404) will be the default displayed image until the Image Proceeding and Display Substrate receives a valid image from the Computer System. Once the pixel array is generated by the Computer System, it is transmitted globally to all Image Processing and Display Substrates (10) simultaneously and received by the User Interface (403). Additionally, the Computer System will generate a Map of all Image Processing and Display Substrates in the Display System which will allow each individual Image Processing and Display Substrate (10) to be aware of the Image Processing and Display Substrate (10) to its left, right, and above and below it. Once the image array and Map are received by a single (or multiple) Image Processing and Display Substrates (10), each receiving substrate will proceed to transmit the information (full Map and array) to all adjacent Image Processing and Display Substrates (10). This will ensure that all Image Processing and Display Substrates will eventually receive the Array and Map by the information propagating from one (or many) Substrate (10) to (eventually) all Substrate. This configuration will allow for the Computer System to be interfaced to a minimal number of Image Processing and Display Substrates (potentially only one), which will facilitate a large-scale display where the Computer cannot be physically or wirelessly connected to all Substrates (10).

Upon receipt of a valid image array and Map, The Microcontroller will 1) load the Map and entire Array into the LCD Process (200) Image buffer. Additionally, the Image that the receiving Substrate is to display will be extracted from the array and loaded into the User Image Buffer (402). Once the image is loaded into the LCD Processor, the Image Processor (200) will begin to periodically broadcast the image information to its adjacent Substrates (10) using the Multi-Panel Interface elements (202, 203 204, and 205) facilitating image propagation. It should be noted that the Multi-Panel Interface elements (202, 203 204, and 205) can be physical or virtual, and their adaptation is independent of the theory defined herein. This process will continue until allowing the propagation of the image to all Substrates (10). In practice, the Computer System will continue to send Image Arrays and the individual panels (10) will continue to propagate that information.

Once an image is received by a Substrate, it will be held until the Image Timing (401) system indicates the image is to be displayed. This timing system will automatically synchronize all Substrates facilitating and overall Presentation timing system allowing for a unified transition across all substrates. In doing so, it is possible for Substrates to buffer one or more images with an associated Presentation Time Stamp facilitating unified transitions allowing for complete animation of images.

The basic art defined herein can be used in the automotive industry, in public transportation, or any area where windows are incorporated and it may be beneficial to have dynamically changeable information displayed. Additionally, the art can be applied as a simple mechanism of dynamically tinting a window to minimize light intrusion.

The uses of the technology and techniques of the present invention are almost infinite. For example, an alternate application would be for homeowners to display information on the front of their homes. This information could range from seasonal graphics to requesting emergency support.

In sum, as will be appreciated by one of ordinary skill in the art armed with the present specification, the basic system of the presently preferred embodiments, because they are based upon LCD technology, allows for windows to remain relatively transparent when not in use. While in use, light necessary for the LCD (backlighting) is provided by the confines which the Image Processing and Display Substrates (10) enclose. This provides flexibility in the image by allowing colored lighting to be used in both seasonal, advertising, emergency applications, etc. while also not blinding or bothering its occupants and providing privacy even in day time etc.

The present invention has been described in connection with various preferred embodiments. However, one of ordinary skill in the art will readily appreciate that the systems, methods, and techniques disclosed herein may be modified to incorporate different features and technologies and be modified to be applicable in a broad array of different situations without departing from the scope and spirit of the invention.

We claim:

1. A Large Scale LCD Display System comprising:

a plurality of image processing and display substrates deployed in an area occupied by a respective window of a building;

means for communicating between said plurality of image and processing substrates;

a microcontroller in communication with at least one of said plurality of image processing and display substrates, said microcontroller being programmed with information including the number and position of each of said plurality of image processing and display substrates and pixel information of each of said plurality of image processing and display substrates; whereby a command sent by said microcontroller to said at least one of said plurality of image processing and display substrates is further communicated to others of said image processing and display substrates via said means for communicating between said substrates, and wherein said command is then further sent from image processing and display substrates to others of said image processing and display substrates until all of said plurality of image processing and display substrates have received said command, and a user interface for inputting an image to said microcontroller for display by said plurality of image processing and display substrates, wherein each individual of said plurality of image processing and display substrates receives a signal to depict a relative portion of the image inputted by said user, whereby the relative portions of the image processing and display substrates result in the overall image being generated when viewed in totality.

2. A method of using a building's glass to generate advertising revenue, comprising:

deploying a plurality of image processing and display substrates in the area of the building's existing window openings;

configuring a microprocessor in communication with at least one of said image processing and display substrates with information including the number and position of each of said image processing and display substrates and pixel information of each of said image processing and display substrates;

uploading an advertisement image into said microprocessor; and providing a signal from said microprocessor to said at least one image processing and display substrates to display a predetermined portion of said advertising image and to communicate said signal to others of said plurality of image processing substrates which in turn communicate said signal to others of said plurality of image and processing substrates until said signal is communicated to all of said image processing and display substrates; whereby each of said image processing and display substrates responds to said signal by displaying a respective predetermined portion of said advertising image;

wherein the advertising image is generated in its totality by the constituent contributions to the image from each respective of said plurality of image processing and display substrates.

* * * * *